United States Patent
Guan et al.

(10) Patent No.: US 9,892,316 B2
(45) Date of Patent: *Feb. 13, 2018

(54) METHOD AND APPARATUS FOR PATTERN TRACKING

(71) Applicant: AIC Innovations Group, Inc., New York, NY (US)

(72) Inventors: Lei Guan, Jersey City, NJ (US); Adam Hanina, New York, NY (US)

(73) Assignee: AIC Innovations Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,695

(22) Filed: May 25, 2017

(65) Prior Publication Data
US 2017/0270355 A1 Sep. 21, 2017

Related U.S. Application Data

(63) Continuation of application No. 13/110,500, filed on May 18, 2011, now Pat. No. 9,665,767.
(Continued)

(51) Int. Cl.
*G06K 9/00* (2006.01)
*G06T 7/246* (2017.01)

(52) U.S. Cl.
CPC .......... *G06K 9/00355* (2013.01); *G06T 7/251* (2017.01); *G06T 2207/30196* (2013.01)

(58) Field of Classification Search
CPC ...... G06K 9/00355; G06T 2207/30196; G06T 7/2046
See application file for complete search history.

(56) References Cited

U.S. PATENT DOCUMENTS

| 3,814,845 A | 6/1974 | Hurlbrink et al. |
| 5,065,447 A | 11/1991 | Barnsley et al. |

(Continued)

OTHER PUBLICATIONS

Huynh et al ("Real time detection, tracking and recognition of medication intake" 2009).*

(Continued)

*Primary Examiner* — Avinash Yentrapati
(74) *Attorney, Agent, or Firm* — Fish & Richardson P.C.

(57) ABSTRACT

A method and apparatus for pattern tracking. The method includes the steps of performing a foreground detection process to determine a hand-pill-hand region, performing image segmentation to separate the determined hand portion of the hand-pill-hand region from the pill portion thereof, building three reference models, one for each hand region and one for the pill region, initializing a dynamic model for tracking the hand-pill-hand region, determining N possible next positions for the hand-pill-hand region, for each such determined position, determining various features, building a new model for that region in accordance with the determined position, for each position, comparing the new model and a reference model, determining a position whose new model generates a highest similarity score, determining whether that similarity score is greater than a predetermined threshold, and wherein if it is determined that the similarity score is greater than the predetermined threshold, the object is tracked.

20 Claims, 1 Drawing Sheet

Related U.S. Application Data

(60) Provisional application No. 61/447,243, filed on Feb. 28, 2011.

(56) References Cited

U.S. PATENT DOCUMENTS

| | | | |
|---|---|---|---|
| 5,441,047 A | 8/1995 | David et al. | |
| 5,544,649 A | 8/1996 | David et al. | |
| 5,619,991 A | 4/1997 | Sloane | |
| 5,646,912 A | 7/1997 | Cousin | |
| 5,752,621 A | 5/1998 | Passamante | |
| 5,764,296 A | 6/1998 | Shin | |
| 5,810,747 A | 9/1998 | Brundy et al. | |
| 5,911,132 A | 6/1999 | Sloane | |
| 5,961,446 A | 10/1999 | Beller et al. | |
| 6,151,521 A | 11/2000 | Guo et al. | |
| 6,173,077 B1 | 1/2001 | Trew et al. | |
| 6,233,428 B1 | 5/2001 | Fryer | |
| 6,236,736 B1 * | 5/2001 | Crabtree | G01S 3/7865 235/383 |
| 6,269,172 B1 * | 7/2001 | Rehg | G06K 9/00369 342/1 |
| 6,283,761 B1 | 9/2001 | Joao | |
| 6,360,003 B1 * | 3/2002 | Doi | G06T 7/20 348/E5.037 |
| 6,380,858 B1 | 4/2002 | Yarin et al. | |
| 6,409,661 B1 | 6/2002 | Murphy | |
| 6,421,650 B1 | 7/2002 | Goetz et al. | |
| 6,483,993 B1 | 11/2002 | Misumi et al. | |
| 6,484,144 B2 | 11/2002 | Martin et al. | |
| 6,535,637 B1 | 3/2003 | Wootton et al. | |
| 6,597,801 B1 * | 7/2003 | Cham | G06K 9/00369 345/474 |
| 6,611,206 B2 | 8/2003 | Eshelman et al. | |
| 6,705,991 B2 | 3/2004 | Bardy | |
| 6,763,148 B1 | 7/2004 | Sternberg et al. | |
| 6,879,970 B2 | 4/2005 | Shiffman et al. | |
| 6,988,075 B1 | 1/2006 | Hacker | |
| 6,999,601 B2 * | 2/2006 | Pavlovic | G06K 9/00335 342/95 |
| 7,152,051 B1 * | 12/2006 | Commons | G06N 3/0454 706/16 |
| 7,184,047 B1 | 2/2007 | Crampton | |
| 7,184,075 B2 | 2/2007 | Reiffel | |
| 7,221,794 B1 | 5/2007 | Gloudemans, II et al. | |
| 7,256,708 B2 | 8/2007 | Rosenfeld et al. | |
| 7,277,752 B2 | 10/2007 | Matos | |
| 7,304,228 B2 | 12/2007 | Bryden et al. | |
| 7,307,543 B2 | 12/2007 | Rosenfeld et al. | |
| 7,317,967 B2 | 1/2008 | DiGianfilippo et al. | |
| 7,340,077 B2 | 3/2008 | Gokturk | |
| 7,395,214 B2 | 7/2008 | Shillingburg | |
| 7,415,447 B2 | 8/2008 | Shiffman et al. | |
| 7,448,544 B1 | 11/2008 | Louie et al. | |
| 7,562,121 B2 | 7/2009 | Berisford et al. | |
| 7,627,142 B2 | 12/2009 | Kurzweil et al. | |
| 7,650,011 B2 * | 1/2010 | Yang | G06K 9/00261 382/103 |
| 7,657,443 B2 | 2/2010 | Crass et al. | |
| 7,692,625 B2 | 4/2010 | Morrison et al. | |
| 7,747,351 B2 * | 6/2010 | Tsusaka | B25J 9/0003 177/25.11 |
| 7,747,454 B2 | 6/2010 | Bartfeld et al. | |
| 7,761,311 B2 | 7/2010 | Clements et al. | |
| 7,769,465 B2 | 8/2010 | Matos | |
| 7,774,075 B2 | 8/2010 | Lin et al. | |
| 7,874,984 B2 | 1/2011 | Elsayed et al. | |
| 7,881,537 B2 | 2/2011 | Ma et al. | |
| 7,908,155 B2 | 3/2011 | Fuerst et al. | |
| 7,912,733 B2 | 3/2011 | Clements et al. | |
| 7,956,727 B2 | 6/2011 | Loncar | |
| 7,983,448 B1 * | 7/2011 | da Vitoria Lobo | G06K 9/00355 382/103 |
| 7,983,933 B2 | 7/2011 | Karkanias et al. | |
| 8,041,457 B2 * | 10/2011 | Ohno | B25J 9/1612 294/106 |
| 8,094,881 B2 * | 1/2012 | Matsugu | G06K 9/00342 348/152 |
| 8,194,921 B2 * | 6/2012 | Kongqiao | G06F 3/017 382/103 |
| 8,253,831 B2 * | 8/2012 | Bobbitt | G06K 9/00711 348/150 |
| 8,321,284 B2 | 11/2012 | Clemets et al. | |
| 8,452,051 B1 * | 5/2013 | Lee | G06F 3/017 382/103 |
| 8,494,214 B2 * | 7/2013 | Bobbitt | G06K 9/00771 382/103 |
| 2001/0049673 A1 | 12/2001 | Dulong et al. | |
| 2001/0056358 A1 | 12/2001 | Dulong et al. | |
| 2002/0026330 A1 | 2/2002 | Klein | |
| 2002/0093429 A1 | 7/2002 | Matsushita et al. | |
| 2002/0143563 A1 | 10/2002 | Hufford et al. | |
| 2003/0164172 A1 | 9/2003 | Chumas et al. | |
| 2003/0190076 A1 | 10/2003 | Delean | |
| 2003/0219146 A1 * | 11/2003 | Jepson | G06K 9/32 382/103 |
| 2003/0225325 A1 | 12/2003 | Kagermeier et al. | |
| 2004/0100572 A1 | 5/2004 | Kim | |
| 2004/0107116 A1 | 6/2004 | Brown | |
| 2004/0155780 A1 | 8/2004 | Rapchak | |
| 2005/0144150 A1 | 6/2005 | Ramamurthy et al. | |
| 2005/0149361 A1 | 7/2005 | Saus et al. | |
| 2005/0180610 A1 | 8/2005 | Kato et al. | |
| 2005/0182664 A1 | 8/2005 | Abraham-Fuchs et al. | |
| 2005/0234381 A1 | 10/2005 | Niemetz et al. | |
| 2005/0267356 A1 | 12/2005 | Ramasubramanian et al. | |
| 2006/0066584 A1 | 3/2006 | Barkan | |
| 2006/0218011 A1 | 9/2006 | Walker et al. | |
| 2006/0238549 A1 | 10/2006 | Marks | |
| 2007/0008112 A1 | 1/2007 | Covannon et al. | |
| 2007/0008113 A1 | 1/2007 | Spoonhower et al. | |
| 2007/0030363 A1 | 2/2007 | Cheatle et al. | |
| 2007/0118389 A1 | 5/2007 | Shipon | |
| 2007/0194034 A1 | 8/2007 | Vasiadis | |
| 2007/0233035 A1 | 10/2007 | Wehba et al. | |
| 2007/0233049 A1 | 10/2007 | Wehba et al. | |
| 2007/0233050 A1 | 10/2007 | Wehba et al. | |
| 2007/0233281 A1 | 10/2007 | Wehba et al. | |
| 2007/0233520 A1 | 10/2007 | Wehba et al. | |
| 2007/0233521 A1 | 10/2007 | Wehba et al. | |
| 2007/0273504 A1 | 11/2007 | Tran | |
| 2008/0000979 A1 | 1/2008 | Poisner | |
| 2008/0093447 A1 | 4/2008 | Johnson et al. | |
| 2008/0114226 A1 | 5/2008 | Music et al. | |
| 2008/0114490 A1 | 5/2008 | Jean-Pierre | |
| 2008/0133058 A1 * | 6/2008 | Ohno | B25J 9/1612 700/259 |
| 2008/0138604 A1 | 6/2008 | Kenney et al. | |
| 2008/0140444 A1 | 6/2008 | Karkanias et al. | |
| 2008/0162192 A1 | 7/2008 | Vonk et al. | |
| 2008/0178126 A1 | 7/2008 | Beeck et al. | |
| 2008/0201174 A1 | 8/2008 | Ramasubramanian et al. | |
| 2008/0219493 A1 | 9/2008 | Tadmor | |
| 2008/0275738 A1 | 11/2008 | Shillingburg | |
| 2008/0290168 A1 | 11/2008 | Sullivan et al. | |
| 2008/0297589 A1 | 12/2008 | Kurtz et al. | |
| 2008/0303638 A1 | 12/2008 | Nguyen et al. | |
| 2009/0012818 A1 | 1/2009 | Rodgers | |
| 2009/0018867 A1 | 1/2009 | Reiner | |
| 2009/0043610 A1 | 2/2009 | Nadas et al. | |
| 2009/0048871 A1 | 2/2009 | Skomra | |
| 2009/0095837 A1 | 4/2009 | Lindgren | |
| 2009/0128330 A1 | 5/2009 | Monroe | |
| 2009/0159714 A1 | 6/2009 | Coyne, III et al. | |
| 2009/0217194 A1 | 8/2009 | Martin et al. | |
| 2009/0245655 A1 | 10/2009 | Matsuzaka | |
| 2010/0042430 A1 | 2/2010 | Bartfield | |
| 2010/0050134 A1 | 2/2010 | Clarkson | |
| 2010/0057646 A1 | 3/2010 | Martin et al. | |
| 2010/0092093 A1 | 4/2010 | Akatsuka et al. | |
| 2010/0134611 A1 * | 6/2010 | Naruoka | G06K 9/00 348/77 |

(56) References Cited

U.S. PATENT DOCUMENTS

| | | | |
|---|---|---|---|
| 2010/0135528 A1* | 6/2010 | Bobbitt | G06K 9/00342 382/103 |
| 2010/0136509 A1 | 6/2010 | Mejer et al. | |
| 2010/0138154 A1 | 6/2010 | Kon | |
| 2010/0255598 A1 | 10/2010 | Melker | |
| 2010/0262436 A1 | 10/2010 | Chen et al. | |
| 2010/0316979 A1 | 12/2010 | Von Bismarck | |
| 2011/0021952 A1 | 1/2011 | Vallone | |
| 2011/0071675 A1* | 3/2011 | Wells | G06K 9/3216 700/250 |
| 2011/0119073 A1 | 5/2011 | Hanina | |
| 2011/0153360 A1 | 6/2011 | Haninia et al. | |
| 2011/0161109 A1 | 6/2011 | Pinsonneault et al. | |
| 2011/0161999 A1 | 6/2011 | Klappert et al. | |
| 2011/0195520 A1 | 8/2011 | Leider et al. | |
| 2011/0275051 A1 | 11/2011 | Hanina et al. | |
| 2012/0075464 A1 | 3/2012 | Derenne et al. | |

OTHER PUBLICATIONS

U.S. Appl. No. 13/110,500, filed May 18, 2011, Guan et al.
Ammouri, S.; Biloduau, G.A, "Face and Hands Detection and Tracking Applied to the Monitoring of Medication Intake," Computer and Robot Vision, 2008. CRV '08. Canadian Conference, 147, 154, May 28-30, 2008.
Batz, et al. "A Computer Vision System for Monitoring Medication Intake," in Proc. IEEE 2nd Canadian Conf. on Computer and Robot Vision, Victoria, BC, Canada, 2005, pp. 362-369.
Bilodeau et al. "Monitoring of Medication Intake Using a Camera System" Journal of Medical Systems 2011. [retrieved on Feb. 18, 2013] Retrieved from ProQuest Technology Collection.
Chen, Pauline W., "Texting as a Health Tool for Teenagers", The New York Times, Nov. 5, 2009, http://www.nytimes.com/2009/11/05/health/05chen.html?_r=1&emc=.
Danya International, Inc., "Pilot Study Using Cell Phones for Mobile Direct Observation Treatment to Monitor Medication Compliance of TB Patients", Mar. 20, 2009, www.danya.com/MDOT.asp.
Final Office Action from PTO, (U.S. Appl. No. 12/620,686), (dated May 8, 2012), 1-24.
Final Office Action from PTO, (U.S. Appl. No. 13/558,377), (dated May 7, 2013), 1-29.
Final Office Action from PTO, (U.S. Appl. No. 12/646,383), (dated May 8, 2012), 1-31.
Final Office Action from PTO, (U.S. Appl. No. 13/588,380), (dated Mar. 1, 2013), 1-27.
Final Office Action from PTO, (U.S. Appl. No. 12/646,603), (dated Feb. 1, 2012), 1-17.
Final Office Action from PTO, (U.S. Appl. No. 12/728,721), (dated Apr. 12, 2012), 1-31.
Final Office Action from PTO, (U.S. Appl. No. 12/815,037), (dated Sep. 13, 2012), 1-15.
Final Office Action from PTO, (U.S. Appl. No. 12/899,510), (dated Aug. 28, 2013).
Final Office Action from PTO, (U.S. Appl. No. 12/898,338), dated Nov. 9, 2012), 1-12.
Final Office Action from PTO, (U.S. Appl. No. 13/189,518), (dated Jul. 23, 2013), 1-16.
Global Tuberculosis Control: A short update to the 2009 report, World Health Organization, (2009).
Huynh et al., "Real time detection, tracking and recognition of medication intake." World Academy of Science, Engineering and Technology 60 (2009), 280-287.
International Preliminary Report on Patentability, (PCT/US2010/056935) (dated May 31, 2012), 1-8.
International Preliminary Report on Patentability, (PCT/US2013/020026) dated May 5, 2015 (13 pages).
Mintchell, "Exploring the Limits of Machine Vision", Automating World, Oct. 1, 2011.
Non-Final Office Action from PTO, (U.S. Appl. No. 12/620,686), (dated Dec. 21, 2011), 1-78.
Non-Final Office Action from PTO, (U.S. Appl. No. 13/558,377), (dated Oct. 22, 2012), 1-21.
Non-Final Office Action from PTO, (U.S. Appl. No. 12/646,383), (dated Dec. 22, 2011), 1-78.
Non-Final Office Action from PTO, (U.S. Appl. No. 13/558,380), (dated Oct. 4, 2012), 1-20.
Non-Final Office Action from PTO, (U.S. Appl. No. 12/646,603), (dated Oct. 13, 2011), 1-74.
Non-Final Office Action from PTO, (U.S. Appl. No. 12/646,603), (dated Jun. 13, 2013), 1-16.
Non-Final Office Action from PTO, (U.S. Appl. No. 12/728,721), (dated Jan. 6, 2012), 1-31.
Non-Final Office Action from PTO, (U.S. Appl. No. 12/728,721), (dated May 9, 2013), 1-25.
Non-Final Office Action from PTO, (U.S. Appl. No. 12/815,037), (dated Mar. 28, 2012), 1-17.
Non-Final Office Action from PTO, (U.S. Appl. No. 12/815,037), (dated Jul. 18, 2013), 1-19.
Non-Final Office Action from PTO, (U.S. Appl. No. 12/899,510), (dated Jan. 23, 2013), 1-20.
Non-Final Office Action from PTO, (U.S. Appl. No. 12/898,338), (dated Jun. 19, 2012), 1-16.
Non-Final Office Action from PTO, (U.S. Appl. No. 13/189,518), (dated Dec. 21, 2012), 1-10.
Non-Final Office Action from PTO, (U.S. Appl. No. 13/235,387), dated Sep. 12, 2013), 1-16.
Osterberg, Lars and Blaschke, Terrence, "Adherence to Medication", New England Journal of Medicine 2005; 353:487-97, Aug. 4, 2005.
Patwardhan et al., *Robust Foreground Detection in Video Using Pixel Layers*, IEEE Transactions on Pattern Analysis and Machine Intelligence, 30(4):746-751 (Apr. 2008).
PCT Search report and written opinion, (PCT/US2010/56935, (dated Jan. 12, 2011), 1-9.
PCT Search report and written opinion, (PCT/US2011/35093, (dated Sep. 12, 2011), 1-8.
PCT Search report and written opinion, (PCT/US11/54666), (dated Feb. 28, 2012), 1-13.
PCT Search report and written opinion, (PCT/US11/54668), dated Feb. 28, 2012, 1-12.
PCT Search report and written opinion, (PCT/US12/41785), (dated Aug. 17, 2012), 1-10.
PCT Search report and written opinion, (PCT/US12/42843), (dated Aug. 31, 2012), 1-8.
PCT Search report and written opinion, (PCT/US2012/051554), (dated Oct. 19, 2012), 1-12.
PCT Search report and written opinion, (PCT/US12/59139), (dated Dec. 18, 2012), 1-15.
PCT Search report and written Opinion, (PCT/US13/20026), (dated Aug. 5, 2013), 1-14.
PR Newswire. "Pilot Study Using Video Cell Phones for Mobile Direct Observation (MOOT) to Monitor Medication Compliance of TB Patients." New York: Mar. 23, 2009.
Shapiro and Stockman, Computer Vision, Chapter 10: Image Segmentation (Mar. 2000), pp. 305-354.
Super-Resolution, Wikipedia, (Oct. 5, 2010).
University of Texas, GuideView, Mar. 15, 2007, http://www.sahs.uth.tmc.edu/MSriram/GuideView/.
V.F.S. Fook et al. "Smart Mote-Based Medical System for Monitoring and Handling Medication Among Persons with Dementia." ICOST 2007, LNCS 4541, pp. 54-62, 2007.
Valin, et al. "Video Surveillance of Medication intake", Int. Conf. of the IEEE Engineering in Medicine and Biology Society, New York City, USA, Aug. 2006.
Vincent and Laganiere, *An Empirical Study of Some Feature Matching Strategies*, Proceedings of the 15th International Conference on Vision Interface, vol. 1, (2002) (7 pages).
Wang et al. "Recent Developments in human motion analysis." Pattern Recognition 36 (220) 585-601 (Nov. 2001).

(56) References Cited

OTHER PUBLICATIONS

Whitecup, Morris S., "2008 Patient Adherence Update: New Approaches for Success", www.guideline.com, The Trend Report Series, (Oct. 1, 2008).

* cited by examiner

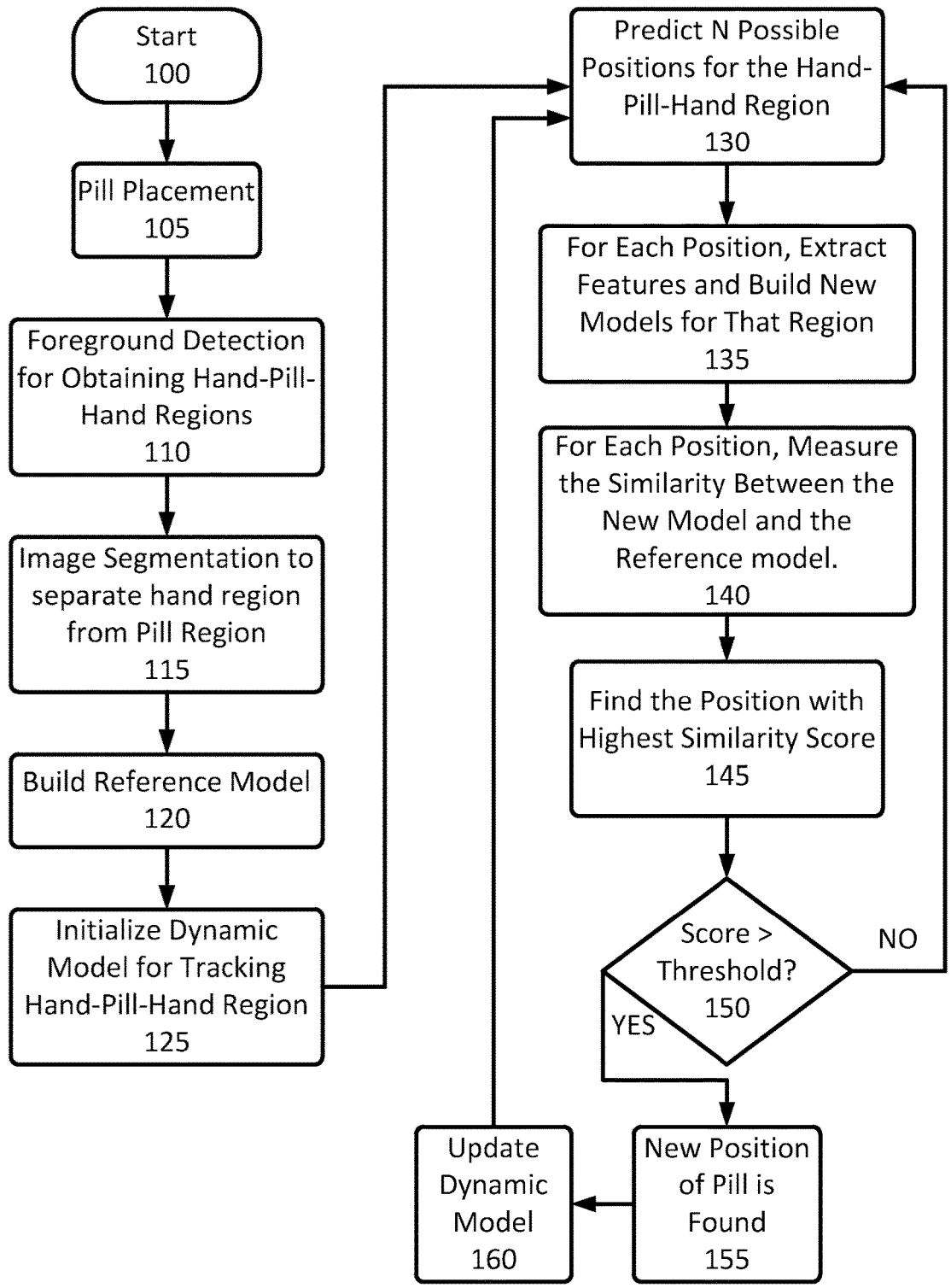

METHOD AND APPARATUS FOR PATTERN TRACKING

CROSS REFERENCE TO RELATED APPLICATION

This application is a continuation and claims priority to U.S. patent application Ser. No. 13/110,500 to Guan et al., filed May 18, 2011, titled "Method and Apparatus for Pattern Tracking", which claims the benefit of U.S. Provisional Patent Application Ser. No. 61/447,243 to Guan et al., filed Feb. 28, 2011, titled "Method and Apparatus for Pattern Tracking". The entire contents of all of the prior applications are incorporated herein by reference.

FIELD OF THE INVENTION

This invention relates generally to the tracking of objects through time and space, and more particularly to the recognition and tracking of a particular object being held by a particular holder by a single web camera or the like employing still or sequential video images. The invention also relates to the tracking of a pill or other medication held between the fingers of a medication administrator.

BACKGROUND OF THE INVENTION

Automatic identification and tracking of objects in three dimensional space utilizing only a standard web cam is difficult in that there is no simple way of determining distance from the camera. Furthermore, selecting a particular object from a plurality of objects may be difficult in that lack of depth perception does not allow for the differentiation of these objects based on position in a direction comprising distance from the camera (z-axis direction). Complicated images may therefore result in an unacceptable number of false positive or false negative responses.

Application of such a tracking scheme to a pill management system may be particularly troublesome in that a pill or other medication may be small, and may be colored similarly to a background object such as the shirt of a user, wall or other object. Furthermore, the user may move the pill or other medication quickly through the field of view of the camera. If implemented on a mobile device or the like, movement of the device in addition to movement of the pill may contribute to tracking difficulties, as may various environmental difficulties, such as poor lighting, background noise and the like. These variables may contribute to a very challenging situation for pill identification and tracking over time.

Therefore, it would be desirable to provide a method and apparatus that overcome the drawbacks of the prior art.

SUMMARY OF THE INVENTION

In U.S. patent application Ser. No. 12/620,686 filed Nov. 18, 2009 titled Method and Apparatus for Verification of Medication Administration Adherence; Ser. No. 12/646,383 filed Dec. 23, 2009 titled Method and Apparatus for Verification of Clinical Trial Adherence; Ser. No. 12/646,603 filed Dec. 23, 2009 titled Method and Apparatus for Management of Clinical Trials; and Ser. No. 12/728,721 filed Mar. 22, 2010 titled Apparatus and Method for Collection of Protocol Adherence Data, the entire contents of each of these applications being incorporated herein by reference, as well as in other co-owned applications, the inventors of the present invention describe a system for automatically monitoring patient adherence to a medication protocol. As part of that application, determination of when a user places a pill in their mouth is an important step. Such a determination further requires that such a pill is first determined to be present in a field of view, and thereafter tracked through that field of view.

As noted above, such a determination may be made particularly difficult when employing a simple webcam that does not include the ability to determine distance, such as with a time of flight camera or a stereo camera pair, and in particular if the determination is to be made on a small pill with a potentially close proximity to the webcam. In such a situation, an image captured by the webcam comprises a two dimensional picture of a scene without the ability to differentiate between near and far objects. Various complications as noted above may make such determinations even more difficult.

In accordance with various embodiments of the invention, known patterns may be exploited in order to track one or more objects. Thus, in one preferred embodiment of the present invention, knowledge of the color of the skin of a user, or user of a range of possible or potential skin tones, may allow for the tracking of a pill or other medication by searching for a combination of colors including "skin-pill-skin", thus allowing for differentiation of such a pill even from a background with a color similar to that of the pill. Once identified, the color sequence may be tracked through various images over time. If the image is lost, prompting may be provided to the user to place the pill at a particular location in the display to allow for re-identification and continued tracking of the pill. Such a tracking scheme may be extended to tracking any number of types of objects, and in particular any such objects being held by a user in a manner in which skin tone from the user's hand or the like is visible in a relatively fixed relationship to such object to be tracked.

The inventive system may also be extended to use in auditing of various desired action sequences, and in particular to a sequence to be performed by, for example, a surgeon, where the skin tone and medical device color combination may be identified and tracked to provide and automated audit of actions performed. Similar audit may be performed to other actions of doctors, nurses, or other healthcare providers. The system may also be applicable to other, non-medical applications.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

The FIGURE is a flowchart diagram depicting an embodiment of the invention.

DETAILED DESCRIPTION OF THE PREFERRED EMBODIMENTS

The invention will now be described making reference to the following drawings in which like reference numbers denote like structure or steps.

In accordance with one or more embodiments of the present invention, when attempting to track a pill being held and administered by a user, an assumption may be made that the pill is always held between two fingers, or otherwise held in the palm of the user. Employing this assumption, a basis for tracking of the pill in accordance with embodiments of the invention may comprise tracking a specific color and/or shape pattern "fingertip-pill-fingertip", "palm-pill-palm", "cup-pill-cup" after determining a fingertip or palm color and/or shape of the user, or the color of a holding device, such as a cup or the like (use of the fingertips and color will be continue to be used through the remainder of the description, although any of the alternative embodiments may be employed), and preferably knowing the color of the pill in advance, although determination of the pill color in real or near-real time may also be provided. As noted above, this sequence may also be applicable to other than a pill, such as a medical instrument or other device to be tracked. In one embodiment of the invention, the user may be asked to place the pill so that when imaged by a webcam, fills a particular portion of a display. A determination of the pill color may be made, and the colors immediately above and below the pill may further be determined to be the fingertips, and thus comprise the fingertip color, of the user. Alternatively, a user may be asked to place their fingers or palm, or both, in a specific location to be imaged so that the color thereof may be determined. Additional characteristics of the pill or other objects to be tracked, such as shape, color combinations, markings or the like may also be employed. The inventive system thereafter may split the imaged region into three sub-regions with individual reference color models for each region (i.e. a model for the top fingertip, a model for the pill and a model for the bottom fingertip), generating a pattern signature that may be distinguishable from other objects or sequences of objects that may enter the field of view of the web cam. Alternatively, as will be described below, a single reference color model may be used for the entire fingertip-pill-fingertip area.

In order to aid in determining whether a pill is a correct pill a comparison of the imaged pill with prior reference images of one or more known pills is made. In this particular instance, features including the color of the fingers and pill, as well as any other characteristic features of the pill and/or fingers that may be relied upon. The features of these images are then each preferably represented by a feature vector. In order to determine similarity between the images, a distance between each pair of image vectors may be calculated, using one or more known techniques, such as Euclidean distance, Mahalanobis distance or one or more other known machine learning methods. Each distance value is then preferably fit into a predetermined Gaussian distribution to generate a probability value which may be used to evaluate similarity. This predetermined Gaussian distribution may be populated by acquisition of various images and processing thereof to generate the distribution. A later acquired image with its feature vector is then compared to the library of acquired images to determine a distance between its feature vector, and the distribution of feature vectors, thus providing a probability value indicative of the likelihood of a match between two images. Thus, through this process, confidence rates, indicative of confidence of a match between an acquired set of images and a reference set of images, may be calculated for each region (finger, pill, finger, for example) by measuring the similarity of an observed color and other noted characteristics, and comparing with a predetermined characteristics each of the one or more reference images. In accordance with an embodiment of the invention, features Score level fusion, decision fusion, or other appropriate processing may be applied to those confidence rates to aid in determining if the region contains the desired pill or not. As a result, if a high level of assurance can be achieved that a newly acquired image is in fact a desired image, it may be possible to reduce further processing power, by reducing resolution, frame rate, etc.; requiring only enough processing power to confirm that the object has not changed. Such features may be beneficial when employing the system on a mobile or other reduced processing powered device.

In addition to comparing any such resulting score or confidence level to one or more thresholds to determine one or more levels of similarity, these confidence levels may be stored and compared over multiple medication administrations to determine whether the user is improving over time in taking their medication or not, and may be used to flag situations where the user may be trying to trick the system, or may benefit from additional training regarding the process of medication administration. Other factors such as lighting, background colors and other conditions may impact a particular acquired color or acquisition of other desired characteristic, and thus may also be employed to suggest a change of location, lighting, hardware, or other issues that may affect the ability of the system to properly acquire images of the system.

Advantages of the inventive method include, among others: 1) it is relatively robust to variations in shape, rotation, scale, lighting, movement of a mobile platform and the like; 2) it is relatively robust to changes background, or background that may have a color similar to the color of the pill or another object; 3) it uses the information based upon pattern identification assumptions.

As noted above, in accordance with various embodiments of the invention, a reference color model for the fingertip regions and pill region may be determined. Separating the colors in this region for proper separate acquisition, while potentially improving subsequent recognition of those elements, presents another challenge. In accordance with this particular embodiment of the invention, no previous knowledge or information regarding the pill, including its color, need be known. This information is preferably captured during run-time (i.e. a first step before the object is tracked). Therefore, the system preferably determines when a hand-pill-hand combination is within a region of interest, and then differentiates the two hand portions and the pill for the purposes of building reference color models. Embodiments of the invention may preferably employ motion information to determine whether the "hand-pill-hand" is within a predetermined region of interest of the image. If large areas of motion are measured, image segmentation techniques may be used to further analyze that region of the image. If that region is able to be segmented into three parts (hand, pill, hand), the inventive system is then able to build the color model for each region. If it is determined that the region cannot be segmented, the system then may further determine that the image of the region being investigated may not include a proper hand-pill-hand combination. Or alternatively, if the region can be determined to include the hand-pill-hand combination, but for some reason cannot be properly segmented, the entire region may be used and included as a single entity.

Therefore, referring first to the FIGURE, processing begins at step 100 and at step 105 a user is asked to place a pill in a particular portion of a field of view of a webcam, as may be indicated to them on a display including their image and a graphical or other locator for pill placement. Once placed in an appropriate location, a foreground detection process is performed at step 110 to determine a hand-pill-hand region in a manner as described above. Thereafter, at step 115, image segmentation may be performed to separate the determined hand portion of the hand-pill-hand region from the pill portion thereof. Then, at step 120, three reference models may be built, one for each hand region and one for the pill region based upon their appearances. Such appearances may include, but are not limited to, shape, color, texture, gray-scale intensity, histogram of colors, or other determinable attributes of the hand and pill. Alternatively, a single reference model for the entire hand-pill-hand region may be built. Next, at step 125, a dynamic model for tracking the hand-pill-hand region is initialized.

Thereafter, based upon that dynamic model, N possible next positions for the hand-pill-hand region may be determined at step 130, and at step 135 for each such determined position, various features may be determined, and a new model for that region may be built in accordance with the determined position. Next, at step 140 for each such position, a comparison is made between the new model and a reference model, and at step 145 a position whose new model generates a highest similarity score (thus, having the smallest feature vector difference) between it and the current reference model is determined. It is then inquired at step 150 whether that similarity score is greater than a predetermined threshold. If it is determined that the similarity score is not greater than a predetermined threshold, and thus the inquiry is answered in the negative, processing returns to step 130, and an additional N possible hand positions may be presented. If on the other hand, the inquiry at step 150 is answered in the affirmative, and it is determined that the similarity score for one of the determined new model positions is grater that the predetermined threshold, processing continues with step 155, where a new position of the pill (and thus the hand-pill-hand combination) is determined to have been found. Processing then moves to step 160 where a new dynamic model is determined, and processing then passes to step 130 where N possible new hand-pill-hand positions are determined.

As is noted in the description of the FIGURE, both motion tracking and image segmentation techniques may be employed. Of course, while only one of these techniques may be employed in isolation, another advantage of the embodiments of the invention that employ motion and image segmentation techniques in combination is that the ratios of the three segmented sub-regions (top hand, pill, bottom hand) can be obtained. The ratios not only help to divide the tracking window into three sub-regions and but also help with subsequent tracking. Although a size of a tracking window may change over time, the approximate ratio of these segmented sub-regions is likely the same, a useful reference point for tracking.

In accordance with another preferred embodiment of the invention, a dynamic feature selection optimization scheme based on one or more decision fusion confidence levels for pill or other object recognition and tracking may be employed. As is well known, and as has been recognized by the inventors of the present invention, processing power is generally considered to be expensive, especially in mobile devices. It has further been determined by the inventors of the present invention that when confidence levels of object or pill identification or object or pill tracking are high, the need to perform high levels of processing may be significantly reduced. This may allow the system to be switched to possibly employ lower performance machine vision computations, resulting in better performance and potentially lower bandwidth requirements. A similar approach may be to downsample images based on confidence levels and multiscaling. For example, an original image could be downsampled to $\frac{1}{20}$, $\frac{1}{10}$, $\frac{1}{5}$ or the like. If the confidence is low in $\frac{1}{20}$ scale, then the system may preferably utilize a next level until an acceptable confidence is achieved. Such adjustments may be made in a dynamic manner because the performance is continually monitored over time and within multiple frames to optimize confidence levels.

In addition, a process of feature selection may be optimized due to the fact that some features require higher computational power than others: a) in predictive color scanning, the inventive system may discard non-core pixel colors that do not match expected results to avoid wasting of computational bandwidth; b) when performing predictive shape scanning, the system may search algorithms based on identifying known comers or images; and c) the system may apply a similar methodology to unique markings on the pill or shape of interest instead of identifying points in a procedural manner. The system therefore may automatically narrow confidence levels to optimize confirmation, and in each case reduce the number of points needed for each feature to optimize accuracy.

In accordance with another embodiment of the invention, upon tracking of a pill or other object, if identification of such an object is difficult, the user may be encouraged by a proximity indicator to bring the pill close enough to the camera to ensure the correct amount of data is captured to both confirm likeness and to ensure the proper metrics are tracked. The system may then guide the user for correct proximity placement to maximize confidence levels of object verification.

Other objects may be tracked with a simple webcam by the user of similar image segmentation and other aspects of the invention. For example, a brand of a pair of shoes may be identified, and the wearer may be offered a discount when walking by. Based upon known patterns, cans of soda or other food items may be similarly tracked, perhaps requesting the user brings such a can closer to the webcam to interact with the user on a new sales promotion. The system may further be applied to injectable medications and the like, inhalers, or other medication delivery systems, and in particular may be employed to confirm activation and/or positioning thereof.

Therefore, in accordance with various embodiments of the invention, determination of a pill being in a patient's mouth may be tracked and confirmed. Because webcams cannot see depth, as long as the pill or other object is substantially surrounded by an unbroken ring of red color (the inner parts of the mouth), then one can safely assume that the pill is no longer held by the fingers or the hand and has been placed in the mouth. The unbroken circle is another pattern to determine placement. The unbroken circle may be determined and tracked in place of the fingertip or palm as noted above. Identification sequences may be similar to those noted above with respect to the finger-pill-finger combination, but rather employing a color determination of mouth-pill-mouth.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for confirming ingestion of a medication pill by a patient, comprising:
   providing to a patient one or more instructions encouraging proper administration of a medication pill;
   receiving one or more images by a camera associated with a computing apparatus of a patient ingesting a medication pill that is visible to the camera response to the one or more instructions;
   performing a foreground detection process on the one or more images to determine a hand-pill-hand region by the computing apparatus;
   performing image segmentation on the hand-pill-hand region to separate the determined hand portion of the hand-pill-hand region from the pill portion thereof by the computing apparatus;
   providing to the patient, in response to a difficulty in performing image segmentation, and in response to the output of a proximity detector associated with the computing device, one or more instructions to bring the medication pill closer to the camera;
   confirming the identity of the pill portion by comparing one or more characteristics of the pill portion to one or more corresponding characteristics of one or more reference images stored to a recording medium associated with the computing apparatus, thereby confirming an expected pill in the hand of the patient;
   performing a further foreground detection process on the one or more images to determine a pill positioned in a patient's mouth by recognizing the pill portion surrounded by an unbroken ring of color corresponding to the inner portion of the mouth of the patient by the computing apparatus;
   wherein upon confirmation of the expected pill in the hand of the patient and the expected pill in the mouth of the patient, medication administration is confirmed; and
   providing by the computing apparatus an indication of the confirmation of the medication administration.

2. The method of claim 1, wherein the determination of the pill in the mouth of the patient is performed after determination of the pill in the hand of the patient.

3. The method of claim 1, wherein the one or more characteristics may be selected from the group of: shape, color, texture, gray-scale intensity and histogram of colors.

4. A method for confirming ingestion of a medication pill by a patient, comprising:
   providing to a patient one or more instructions encouraging proper administration of a medication pill;
   receiving one or more images by a camera associated with a computing apparatus of a patient ingesting a medication pill that is visible to the camera in response to the one or more instructions;
   performing a foreground detection process of an image or series of images of the one or more received images to determine a mouth-pill-mouth region by the computing apparatus;
   performing image segmentation of the image or series of images to separate the determined mouth portion of the mouth-pill-mouth region from the pill portion thereof by the computing apparatus;
   providing to the patient, in response to a difficulty in performing image segmentation, and in response to the output of a proximity detector associated with the computing device, one or more instructions to bring the medication pill closer to the camera;
   confirming the identity of the pill portion in the mouth of the patient by comparing one or more characteristics of the pill portion to one or more corresponding characteristics of one or more reference images, thereby confirming ingestion of the pill portion by the patient by the computing apparatus; and
   providing on the computing apparatus an indication of the confirmation of the medication administration.

5. The method of claim 4, further comprising:
   building one or more reference models including at least the mouth region and the pill region;
   determining a feature vector of the mouth-pill-mouth region;
   comparing the determined feature vector to one or more reference feature vectors;
   determining a distance between the determined feature vector and each of the one or more reference feature vectors;
   determining an image or set of images corresponding to the determined feature vector to be similar to an image or set of images whose corresponding feature vector when the determined distance is less than a predetermined threshold;
   fitting each determined distance into a Gaussian distribution to determine a confidence probability of a match between the two corresponding images or sets of images, thereby confirming the identity of the pill in the mouth of the patient.

6. A method for tracking a pill in a user's mouth comprising:
   providing to a patient one or more instructions encouraging proper administration of a medication pill;
   acquiring one or more images by a camera associated with a computing apparatus in response to the one or more instructions;
   determining a mouth-pill-mouth portion of one or more of the acquired images by the computing apparatus;
   providing to the patient, in response to a difficulty in determining the mouth-pill-mouth portion of the one or more acquired images, and in response to the output of a proximity detector associated with the computing apparatus, one or more instructions to bring the mouth-pill-mouth portion closer to the camera;
   storing an indication of one or more characteristics of the mouth-pill-mouth portion to a storage medium associated with the computing apparatus,
   determining a location of the mouth-pill-mouth portion in a next one or more of the acquired images in accordance with the one or more stored indications,
   thereby confirming a pill continues to be positioned within the mouth of the user by the computing apparatus; and
   providing on the computing apparatus an indication of the confirmation of the medication administration.

7. The method of claim 6, further comprising storing a color signature of the mouth-pill-mouth portion of the one or more of the acquired images as the indication of the one or more characteristics.

8. The method of claim 7, further comprising determining the location of the mouth-pill-mouth portion in a next one or more of the acquired images in accordance with the stored color signature.

9. The method of claim 7, further comprising distinguishing the pill even though it is colored similarly to a background in accordance with the stored color signature.

10. The method of claim 9, wherein the background is a portion of the mouth of the user.

11. The method of claim 9, wherein the background is an environmental surface.

12. The method of claim 6, wherein determining a mouth-pill-mouth portion of one or more of the acquired images further comprises:
 performing a foreground detection process of an image or series of images to determine a mouth-pill-mouth region;
 performing image segmentation of the image or sequence of images to separate the determined mouth portion of the mouth-pill-mouth region from the pill portion thereof; and
 building one or more reference models including at least one of the hand region and the pill region.

13. The method of claim 12, further comprising determining a feature vector difference between at least one of the one or more reference models and a mouth-pill-mouth portion of one or more of the one or more acquired images.

14. The method of claim 13, wherein if the vector difference is less than a predetermined threshold, there is determined to be a match.

15. The method of claim 12, wherein the foreground detection process takes into account one or more environmental factors.

16. The method of claim 15, wherein the one or more environmental factors comprises ambient light.

17. The method of claim 6, wherein the one or more characteristics comprises shape.

18. The method of claim 6, wherein the one or more characteristics comprises color.

19. The method of claim 6, further comprising repeating the processing for a plurality of consecutive acquired images.

20. The method of claim 19, wherein processing is performed on a subset of the plurality of consecutive acquired images.

* * * * *

UNITED STATES PATENT AND TRADEMARK OFFICE
CERTIFICATE OF CORRECTION

PATENT NO.        : 9,892,316 B2
APPLICATION NO.   : 15/605695
DATED             : February 13, 2018
INVENTOR(S)       : Lei Guan and Adam Hanina Page 1 of 1

It is certified that error appears in the above-identified patent and that said Letters Patent is hereby corrected as shown below:

In the Claims

Column 7, Line 11: In Claim 1, delete "camera" and insert -- camera in --, therefor.

Signed and Sealed this
First Day of May, 2018

Andrei Iancu
*Director of the United States Patent and Trademark Office*